United States Patent [19]
Keirsbilck

[11] Patent Number: 5,920,350
[45] Date of Patent: Jul. 6, 1999

[54] CAMERA INCLUDING MEANS FOR ACQUIRING BI-DIRECTIONAL SOUND

[75] Inventor: Richard Scott Keirsbilck, Rochester, N.Y.

[73] Assignee: Eastman Kodak Company, Rochester, N.Y.

[21] Appl. No.: 08/631,504

[22] Filed: Apr. 12, 1996

Related U.S. Application Data

[60] Provisional application No. 60/001,809, Aug. 4, 1995.

[51] Int. Cl.$^6$ .................................................. H04N 5/225
[52] U.S. Cl. ........................... 348/374; 348/376; 352/34; 358/906; 381/365; 396/312
[58] Field of Search ...................................... 348/207, 373, 348/374, 375, 376, 232; 352/1, 25, 34, 35; 381/91, 92, 155, 168, 169, 356, 357, 358, 365; 396/310, 312; 358/906, 909.1; H04N 5/225

[56] References Cited

U.S. PATENT DOCUMENTS

| | | | |
|---|---|---|---|
| 4,009,355 | 2/1977 | Poradowski | 381/155 |
| 4,399,327 | 8/1983 | Yamamoto et al. | 179/1 DM |
| 4,436,966 | 3/1984 | Botros | 381/155 |
| 4,876,723 | 10/1989 | Fang | 381/182 |
| 5,226,076 | 7/1993 | Baumhauer, Jr. et al. | 379/388 |
| 5,263,093 | 11/1993 | Nakamura et al. | 381/168 |
| 5,268,965 | 12/1993 | Badie et al. | 381/91 |
| 5,282,245 | 1/1994 | Anderson | 379/433 |
| 5,521,635 | 5/1996 | Mitsuhashi et al. | 348/207 |
| 5,657,084 | 8/1997 | Kurokawa et al. | 348/373 |

*Primary Examiner*—Wendy Garber
*Assistant Examiner*—Ngoc-Yen Vu
*Attorney, Agent, or Firm*—Gordon M. Stewart

[57] ABSTRACT

A camera having a microphone for detecting sound in a bi-directional manner. The microphone, for example a first order gradient microphone, is placed within a camera body and is in communication with two apertures extending from the front and rear surfaces of the camera body. Background noise is reduced and sound from the scene being photographed and the user of the camera is preferentially detected by the microphone. Preferably, the microphone is mounted in a substantially resilient and acoustically opaque material to reduce stray noises, such as from the motors of the camera.

9 Claims, 1 Drawing Sheet

CAMERA INCLUDING MEANS FOR ACQUIRING BI-DIRECTIONAL SOUND

CROSS REFERENCE TO RELATED APPLICATION

Reference is made to and priority claimed from U.S. Provisional Application Ser. No. U.S. 60/001,809, filed Aug. 4, 1995, entitled CAMERA INCLUDING MEANS FOR ACQUIRING BI-DIRECTIONAL SOUND.

FIELD OF THE INVENTION

The present invention relates to a camera that includes means for acquiring sound, and more particularly relates to a camera that includes means for acquiring bi-directional sound and reducing background noise.

BACKGROUND OF THE INVENTION

Numerous problems are encountered when using a handheld camera that incorporates sound receiving and recording means, such as a video camera or a photographic camera. If the microphone is mounted on the rear of the camera facing the user, the user must turn or otherwise manipulate the camera to adequately receive sounds from the scene being imaged. Similarly, it is difficult to capture interactive conversation between the camera user and the camera subject if the microphone is mounted on the front or rear of the camera. Also, microphones that are mounted onto cameras often protrude significantly from the camera and therefore make the camera bulkier and more cumbersome to use and transport. Such microphones also do little to reduce the detection of noise that is generated by the camera.

Numerous approaches have been used to reduce background noise and/or increase the directionality of microphones used for various purposes. For example, U.S. Pat. No. 4,436,966 by Botros is directed to a teleconference microphone unit wherein a transducer is disposed between two dish-like sound collectors. The transducer is placed at the junction of two dish-like sound collectors which are back-to-back with their convex sides and an opening in each dish exposes the transducer to its concave side.

U.S. Pat. No. 4,742,548 by Sessler et al. discloses a unidirectional second order gradient microphone. Baffles are used to improve the directionality and frequency response of the microphone.

U.S. Pat. No. 4,009,355 by Poradowski discloses a reversible anti-noise microphone for use in a communications headset. The device uses a transducer to which there are two exclusive paths. The lengths of the paths are inherently unequal and unequal acoustical resistances are used in each path to equalize the response to sounds from the front and rear.

U.S. Pat. No. 5,226,076 by Baumhauer, Jr. et al. is directed to a directional microphone assembly. The assembly is constructed from a first order gradient (FOG) microphone element enclosed within a housing that is molded from an acoustically opaque material, such as Ethylene-Propylene-Diene-Monomer. Acoustic waveguides are used to increase the path distance between opposite sides of the transducer and improve sensitivity. The microphone is configured to be embedded within an exterior surface of sound-input equipment with both openings of the housing located along the exterior surface.

U.S. Pat. No. 5,282,245 by Anderson discloses a tubular bi-directional microphone used in a telephone. The microphone provides a bipolar response pattern and cancels unwanted noise incident upon the microphone at the sides of the tubular member, as well as noise above a particular frequency dictated by the length of the tubular member. The tubular members are preferably flared.

There remains a need for an inexpensive means for bi-directional sound detection with good noise cancelling characteristics, particularly for cameras and similar devices. It would be advantageous if the directionality was increased as compared to prior art devices and undesirable noise detection was reduced, including noise from the camera. Further, it would be advantageous if a substantial protrusion from the body of the camera was not necessary. This is particularly important due to the increased miniaturization of cameras designed to be handheld and easily transported.

SUMMARY OF THE INVENTION

According to one embodiment of the present invention, a camera having sound detection means is provided. The camera comprises a camera body, microphone means mounted within the camera body having forward and rearward surfaces, and a front aperture extending through at least a portion of the camera body and forming a front port for receiving sound waves from in front of the camera, the aperture terminating at the forward surface of the microphone means. The camera also includes a rear aperture that extends through at least a portion of the camera body forming a rear port on the back surface of the camera body for receiving sound waves from the rear of the camera, wherein the rear aperture terminates at the rearward surface of the microphone means. The camera can be a video camera or a still image camera.

According to one aspect of this embodiment of the invention, microphone means is mounted in the aperture with mounting means comprising a substantially resilient and acoustically opaque material. The resilient and acoustically opaque material can preferably include ethylene-propylene-diene-monomer. The microphone means can preferably be a first order gradient microphone element. Preferably, the microphone means is positioned such that the maximum sensitivity axis of the diaphragm means is substantially parallel to a central axis formed by the apertures. The length of the apertures is preferably the same.

According to another embodiment of the present invention, a camera including sound detection and recording means is provided. The camera includes a camera body having a front surface and rear surface. A first order gradient microphone is mounted within the camera body and has a forward surface and a rearward surface. A front aperture extends through at least a portion of the camera body, forming a front port on the front surface of the camera body and terminating at the forward surface of the microphone. A rear aperture extends through at least a portion of the camera body, forming a rear port on the back surface of the camera body and terminating at the rearward surface of the microphone. Mounting means substantially surround and secure the microphone within the camera body, wherein the mounting means is made with a material that is substantially resilient and acoustically opaque. The camera also includes recording means adapted to record the sound that is detected by the microphone.

DESCRIPTION OF THE INVENTION

A camera according to the present invention provides an economical means for detecting sound in a bi-directional manner. The structure utilized to receive the bi-directional sound can be incorporated into virtually any camera or similar device that requires the detection of sound from certain positions while reducing sound from other directions (e.g. background noise). As used herein, the term camera refers to any device for recording visual images, such as a still image camera (e.g. silver halide, digital or the like) or a video camera. The structure is particularly advantageous in cameras that are handheld by the user since it enables sound to be received from in front of the camera, i.e. the scene being imaged, as well as from the rear of the camera, i.e. sound from the operator, while extraneous noises from other sources, such as background noise and noise generated by the camera mechanisms, are advantageously reduced. No protrusions are necessary to receive the bi-directional sound, as is often the case in prior devices.

Figure 1:
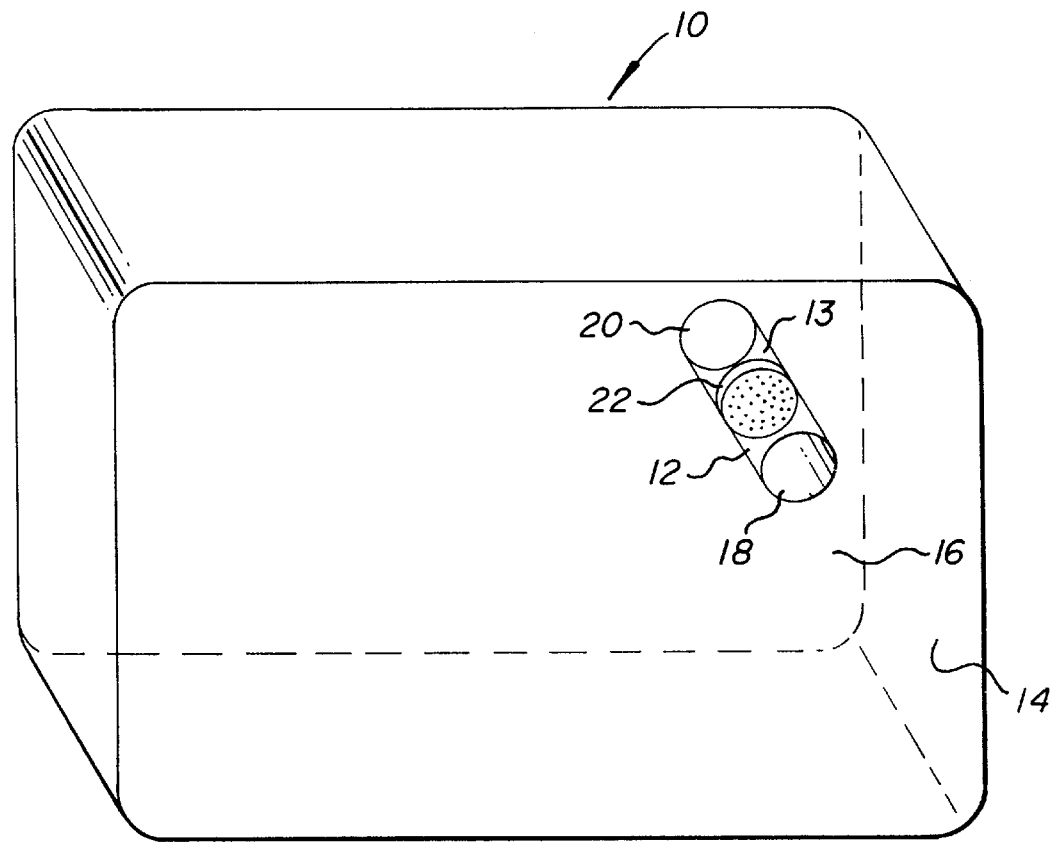
FIG. 1 illustrates a perspective view of a camera according to one embodiment of the present invention.

Referring to FIG. 1, a camera according to one embodiment of the present invention is illustrated. For the sake of simplicity, components of the camera body 10, such as the lens, shutter and other mechanisms, are not illustrated. The camera body 10 includes a front aperture 12 that extends from the front surface 14 of the camera to microphone means 22, forming a front port 18 for receiving sound from the front of the camera. The camera body also includes a rear aperture 13 that extends from the back surface 16 of the camera to the back side of the microphone means 22, forming a rear port 20 for receiving sound from the back of the camera.

Although illustrated as substantially cylindrical, the apertures 12 and 13 can have virtually any shape provided that there is communication between the front port 18 and the microphone means 22 as well as the rear port 20 and the microphone means 22. The camera may employ different shape apertures or may use acoustic resistance means within the apertures to alter the relative response of the microphone means 22, if that is desirable. Further, it is not necessary that the apertures be symmetrical, and it may be desirable in certain applications to form one port smaller than the other. Sound level differences, if any, can be normalized or corrected by employing subsequent, electronic automatic gain control circuits.

The microphone means 22 is preferably a first order gradient (FOG) microphone. A FOG microphone includes a moveable diaphragm with front and back surfaces. The diaphragm moves in reaction to sound waves impinging on its front and back surfaces and this movement is converted to an electrical signal. FOG microphones have the advantage that sound waves which arrive at the front and back surfaces simultaneously do not produce a substantial electrical signal and as a result less background noise is detected.

The structure according to the present invention enhances the directionality of a FOG microphone by increasing the effective path length that a sound wave travels in reaching the opposite surfaces of the diaphragm. The camera body 10 is advantageously used to extend the acoustic path to the opposite side of the microphone means 22 for sound waves arriving on-axis to the maximum sensitivity axis of the microphone means 22. Thus, the front and rear sound waves will be greatly phase-shifted relative to each other. The acoustical path lengths are substantially equal for sound waves arriving at about 900° to the maximum sensitivity axis, e.g. sound waves from the sides of the camera and above and below the camera. Operational noise emanating from the camera is also reduced.

The camera also preferably includes recording means (not illustrated) that is connected to the microphone means 22 and is adapted to record the sound detected by the microphone means 22. As those skilled in the art will appreciate, the recording means can be in many forms, including magnetic or digital recording means.

Figure 2:
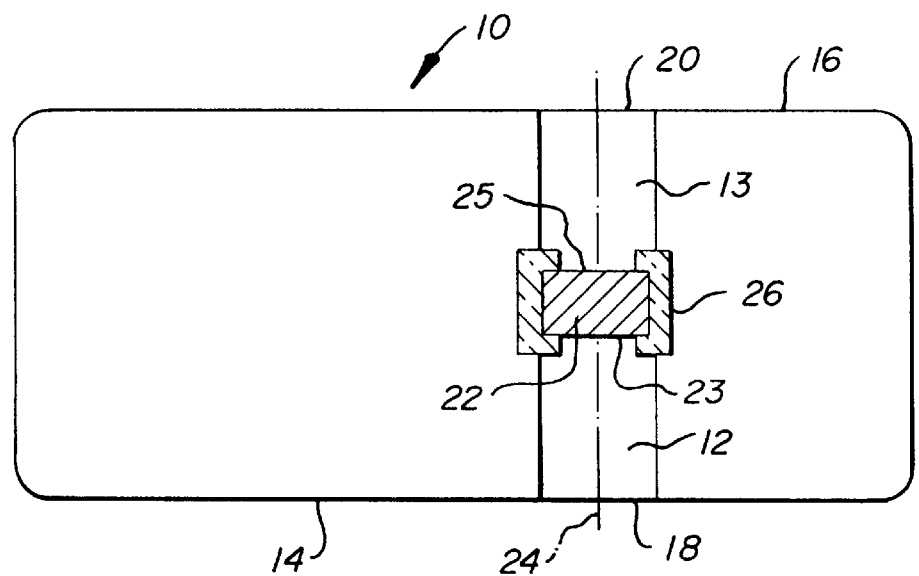
FIG. 2 illustrates a cut-away view of a camera according to an embodiment of the present invention.

FIG. 2 illustrates a cut-away view of a camera similar to the camera illustrated in FIG. 1. The front aperture 12 extends from the front surface 14 of the camera body 10 and terminates at the forward surface 23 of the microphone means 22, which is mounted at approximately the center of the apertures 12 and 13. The rear aperture 13 extends from the back surface 16 to the rearward surface 25 of the microphone means 22. The apertures can preferably form a central axis 24 therethrough which is substantially aligned with the maximum sensitivity axis of the microphone means 22. This configuration maximizes the sensitivity of the microphone means 22 in the forward and rearward directions, while minimizing the sound pickup from other directions, i.e. above, below and to the sides of the camera body 10.

The microphone means 22 is mounted in the aperture using mounting means 26. In a preferred embodiment, the mounting means 26 is a ring of compressible, substantially resilient and acoustically opaque material that is substantially self-sealing. The sealing means 26 preferably completely surrounds the circumference of the microphone means 22 to seal and hold the microphone means 22 in place. The resiliency of the mounting means 26 dampens and reduces noise from the operation of the camera since the noise (i.e. vibrations) cannot mechanically propagate through the acoustically opaque mounting material. Such noise or vibrations result from the various motors and other mechanisms found in modern cameras. In one preferred embodiment, the mounting means 26 is a ring of ethylene-propylene-diene-monomer.

In addition, an acoustically opaque mounting means 26 assures that the front port 18 and rear port 20 are acoustically isolated from each other, so that substantially no sound waves in one aperture can get around the microphone means 22 to the other side.

The camera according to the present invention provides excellent bi-directional sound detection without an increase in overall cost of the camera by increasing the directionality using the body of the camera. Camera noise pickup is advantageously reduced by means of isolation dampening. Further, the foregoing is achieved without the use of any substantial protrusions from the camera.

While various embodiments of the present invention have been described, it is apparent that modifications and adaptations of those embodiments will occur to those skilled in the art. However, it is to be expressly understood that such modifications and adaptations are within the spirit and scope of the present invention.

Parts list for FIGS. 1–2

10 camera body
12 front aperture
13 rear aperture
14 front surface
16 rear surface
18 front port
20 rear port
22 microphone means
23 forward surface (microphone)
24 central axis
25 rearward surface (microphone)
26 mounting means

What is claimed is:

1. A camera having sound detection means, comprising:

a camera body having a front surface and a back surface;

microphone means mounted within said camera body, said microphone means comprising a forward surface and a rearward surface;

a front aperture extending through at least a portion of said camera body forming a front port on said front surface for receiving sound waves and terminating at said forward surface of said microphone means; and a rear aperture extending through at least a portion of said camera body forming a rear port on said back surface for receiving sound waves and terminating at said rearward surface of said microphone means;

wherein the front and rear apertures are positioned so that the camera body increases directionality of the microphone means by extending an acoustic path to an opposite surface of the microphone means for sound waves arriving toward the forward or rearward surface and on-axis to a maximum sensitivity axis of the microphone means;

wherein said microphone means is a single microphone with a moveable diaphragm which moves in reaction to sound waves impinging on the forward surface and the rearward surface.

2. A camera as recited in claim 1, wherein said microphone means is mounted in said camera body with mounting means comprising a substantially resilient and acoustically opaque material.

3. A camera as recited in claim 2, wherein said resilient and acoustically opaque material comprises ethylene-propylene-diene-monomer.

4. A camera as recited in claim 1, wherein the length of said front and rear apertures is substantially the same.

5. A camera as recited in claim 1, wherein said microphone means that is positioned such that the maximum sensitivity axis of said microphone means is substantially parallel to a central axis formed by said front and rear apertures.

6. A camera as recited in claim 1, wherein said camera further comprises recording means adapted to record sound detected by said microphone means.

7. A camera as recited in claim 1, wherein said camera is a video camera.

8. A camera as recited in claim 1, wherein said camera is a photographic camera.

9. A camera including sound detection and recording means, comprising:

(a) a camera body having a front surface and a back surface;

(b) a microphone mounted within said camera body, said microphone comprising a forward surface and a rearward surface;

(c) a front aperture extending through at least a portion of said camera body forming a front port on said front surface for receiving sound waves and terminating at said forward surface of said microphone;

(d) a rear aperture extending through at least a portion of said camera body forming a rear port on said back surface for receiving sound waves and terminating at said rearward surface of said microphone;

(e) mounting means substantially surrounding and securing said microphone within said camera body, wherein said mounting means comprises a material that is substantially resilient and acoustically opaque; and (f) recording means adapted to record sound detected by said microphone;

wherein the front and rear apertures are positioned so that the camera body increases directionality of the microphone by extending an acoustic path to an opposite surface of the microphone for sound waves arriving toward the forward or rearward surface and on-axis to a maximum sensitivity axis of the microphone;

wherein said microphone is a single microphone with a moveable diaphragm which moves in reaction to sound waves impinging on the forward surface and the rearward surface.

* * * * *